United States Patent [19]
Ueno et al.

[11] Patent Number: 5,750,264
[45] Date of Patent: May 12, 1998

[54] ELECTRONIC COMPONENT AND METHOD FOR FABRICATING THE SAME

[75] Inventors: Iwao Ueno, Kyoto; Yasuo Wakahata, Osaka, both of Japan

[73] Assignee: Matsushita Electric Industrial Co., Inc., Kadoma, Japan

[21] Appl. No.: 543,805

[22] Filed: Oct. 16, 1995

[30] Foreign Application Priority Data

Oct. 19, 1994 [JP] Japan ................................. 6-253420
May 31, 1995 [JP] Japan ................................. 7-133335

[51] Int. Cl.⁶ ........................................................ B32B 17/00
[52] U.S. Cl. ........................... 428/426; 428/428; 428/432; 428/688; 428/697; 428/698; 428/701; 428/702
[58] Field of Search .............................. 428/688, 698, 428/701, 702, 426, 428, 432, 697

[56] References Cited

FOREIGN PATENT DOCUMENTS

| 547513 | 2/1993 | Japan . |
| 5109506 | 4/1993 | Japan . |
| 5121211 | 5/1993 | Japan . |
| 696907 | 4/1994 | Japan . |
| 6124807 | 5/1994 | Japan . |

*Primary Examiner*—Timothy Speer
*Attorney, Agent, or Firm*—Renner, Otto, Boisselle & Sklar

[57] ABSTRACT

The electronic component of the present invention includes: an element having an internal electrode therein; an external electrode formed on an end portion of the element where an end face of the internal electrode is exposed; and a protection layer formed on the entire surface of the element except for the end portion of the element, wherein the protection layer is made of a metal oxide.

22 Claims, 16 Drawing Sheets

ELECTRONIC COMPONENT AND METHOD FOR FABRICATING THE SAME

BACKGROUND OF THE INVENTION

1. Field of the Invention

The present invention relates to an electronic component and a method for fabricating the same. More specifically, the present invention relates to an electronic component which includes a very rigid and solid protection layer made of a metal oxide, so that an element covered with the protection layer is effectively sealed (i.e., having excellent moisture resistance and chemical resistance, for example) and insulated, and the resultant electronic component has excellent mechanical strength and can be smoothly mounted, and a method for fabricating the same.

2. Description of the Related Art

Conventionally, an element of an electronic component is covered with a protection layer in order to protect the element from damage (for example, breaking, cracking, and being strained) and deterioration (due to moisture, gas, acid, alkali, and the like). For example, Japanese Laid-Open Patent Publication No. 5-47513 and No. 6-96907 disclose a multilayer varistor having a glass protection layer. Japanese Laid-Open Patent Publication No. 6-124807 discloses a multilayer varistor having layers made of $Fe_2O_3$ or glass formed at the top and bottom of the varistor. A resin protection layer made of a thermosetting resin and the like is also known.

A glass protection layer tends to be peeled off or cracked by shock and heat, and consequently allows water to enter inside through the peeled or cracked portion. The resin protection layer, which is hygroscopic itself, does not sufficiently work as a protection layer because a protection layer must shut off the inside from an external environment. The protection layers formed at the top and bottom of the varistor as disclosed in Japanese Laid-Open Patent Publication No. 6-124807 do not cover the entire surface of an element of the varistor, and thus, do not provide sufficient sealing. Accordingly, conventional protection layers fail to provide sufficient sealing (i.e., moisture resistance and chemical resistance, for example) and insulation to an element covered with the protection layer.

Further, the glass protection layer tends to be peeled off and crack as described above. Accordingly, the resultant electronic component having a glass protection layer is poor in mechanical strength and cannot be smoothly mounted.

Thus, an electronic component capable of providing excellent sealing and insulation of an element thereof as well as excellent mechanical strength and smooth mounting is desired.

SUMMARY OF THE INVENTION

The electronic component of this invention includes: an element having an internal electrode therein; an external electrode formed on an end portion of the element where an end face of the internal electrode is exposed; and a protection layer formed on the entire surface of the element except for the end portion of the element, wherein the protection layer is made of a metal oxide.

In one embodiment of the invention, the electronic component further includes a glass layer formed on the surface of the protection layer.

In another embodiment of the invention, the metal oxide contains a vitreous substance.

Alternatively, the electronic component includes: an element; electrodes formed on a top surface and a bottom surface of the element; and a protection layer formed on the entire surface of the element except for portions where the electrodes have been formed, wherein the protection layer is made of a metal oxide.

According to another aspect of the invention, a method for fabricating an electronic component is provided. The method includes the steps of: forming an external electrode on an end portion of an element having an internal electrode therein where the internal electrode is exposed; forming a metal coat layer on the entire surface of the element except for a portion where the external electrode has been formed; and heat-treating the element with the external electrode and the metal coat layer formed thereon so as to oxidize the metal coat layer on the element and thus to form a protection layer made of a metal oxide.

In one embodiment of the invention, the method further includes the step of forming a metal plating layer on the external electrode.

In another embodiment of the invention, the method further includes the step of dipping the element in an alkaline solution of hydrogen peroxide after the step of forming a metal plating layer, so as to reoxidize the protection layer.

In still another embodiment of the invention, the metal coat layer is formed by electroless metal plating.

In still another embodiment of the invention, the electroless metal plating is conducted using one of Ni and Cu as a major component.

In still another embodiment of the invention, powders containing at least one selected from the group consisting of compounds containing Si, Ti, Al, Mg, and Zr which form oxides by heat treatment are dispersed in a metal plating solution used for the electroless metal plating.

In still another embodiment of the invention, glass powders are dispersed in a metal plating solution used for the electroless metal plating.

Alternatively, the method for fabricating an electronic component includes the steps of: dipping an element having an external electrode on a portion of a surface of the element and a protection layer made of a metal oxide on the other portion of the element where the external electrode has not been formed in a solution containing a glass formation substance; and forming a glass layer by heat-treating the element removed from the solution.

In one embodiment of the invention, the method further includes the step of forming a resist on the external electrode before the step of dipping the element in a solution containing a glass formation substance, wherein the resist is carbonized simultaneously with the formation of the glass layer by heat-treating the element removed from the solution after the step of dipping the element, and is removed from the surface of the external electrode.

In another embodiment of the invention, the resist is a paste.

In still another embodiment of the invention, the solution includes at least one selected from the group consisting of silica compounds represented by $Si(OR^1)_4$ and $R^2_m Si(OH)_{4-m}$; titanium compounds represented by $Ti(OR^3)_4$ and $R^4_n Ti(OH)_{4-n}$; and aluminum compounds represented by $Al(OR^5)_3$ and $R^6_q Al(OH)_{3-q}$ (wherein $R^1$ to $R^6$ individually denote alkyl groups having 1 to 3 carbon atom(s), m and n are individually 0 to 4, and q is 0 to 3), an additive containing a vitrifying agent and an organic binder, and an organic solvent.

In still another embodiment of the invention, a filler containing at least one selected form the group consisting of needle-like crystals of $Al_2O_3$, $TiO_2$, ZnO, SiC, $Si_3N_4$, and $SiO_2$, carbon fibers, and glass fibers is dispersed in the solution.

In still another embodiment of the invention, a second filler containing at least one compound selected from the group consisting of $Bi_2O_3$ and $Sb_2O_3$ is dispersed in the solution.

In still another embodiment of the invention, the step of forming a glass layer is conducted by heating the element by putting the surface of the element in contact with powders containing at least one selected from the group consisting of compounds containing Si, Ti, Al, Mg, and Zr which form oxides by heat treatment.

Alternatively, the method for fabricating an electronic component includes the steps of: dipping an element having an external electrode on a portion of a surface of the element and a protection layer made of a metal oxide on the other portion of the element where the external electrode has not been formed in a solution containing a resin component; and hardening the resin component by heating the element removed from the solution.

Alternatively, the method for fabricating an electronic component includes the steps of: dipping an element having a protection layer made of a metal oxide formed on the entire surface of the element except for an end portion and an external electrode covering the end portion and a portion of the protection layer in a solution containing a glass formation substance; and forming a glass layer by heat-treating the element removed from the solution.

Alternatively, the method for fabricating an electronic component includes the steps of: dipping an element having a protection layer made of a metal oxide formed on the entire surface thereof except for an end portion and an external electrode on the end portion and a portion of the protection layer in a solution containing a resin component; and hardening the resin component by heating the element removed from the solution.

In one embodiment of the invention, the resin component is selected from silicone resins and epoxy resins.

Thus, the invention described herein makes possible the advantages of (1) providing an electronic component where the sealing of an element thereof is significantly high, ensuring the protection of the element from water, gas, acid, alkali, and the like, and thus excellent moisture resistance and chemical resistance can be provided; (2) providing an electronic component where the insulation of an element thereof is significantly high and thus surface leakage and migration at an external electrode are effectively reduced; (3) providing an electronic component which has excellent mechanical strength and shock resistance and thus can be smoothly mounted; and (4) providing a method for fabricating such electronic components.

These and other advantages of the present invention will become apparent to those skilled in the art upon reading and understanding the following detailed description with reference to the accompanying figures.

DESCRIPTION OF THE PREFERRED EMBODIMENTS

Figure 1:
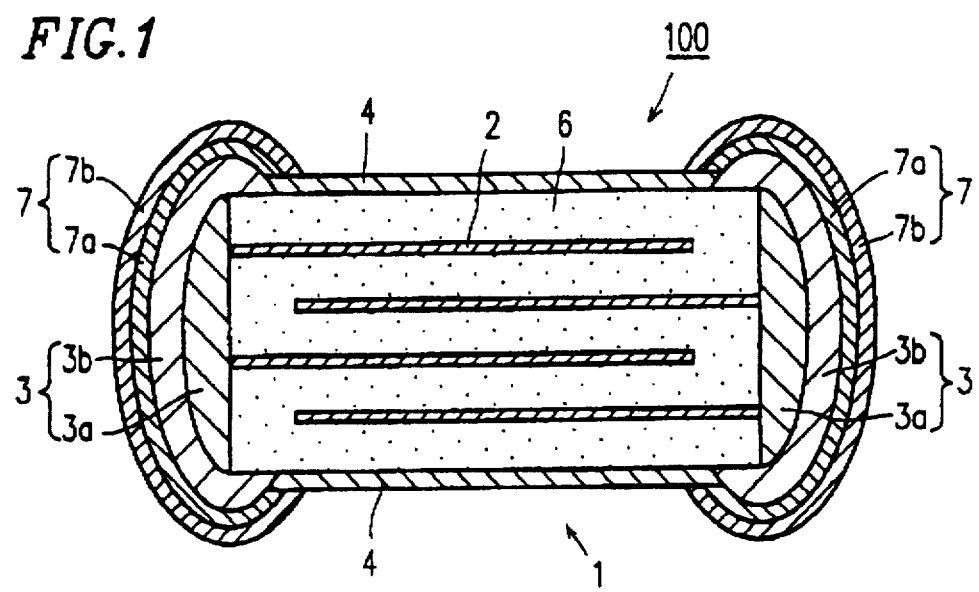
FIG. 1 is a schematic sectional view showing an example of an electronic component according to the present invention.

Referring to FIG. 1, a multilayer varistor will be described as a preferred embodiment of an electronic component according to the present invention.

A multilayer varistor 100 includes: an element 1 of a rectangular parallelepiped shape having internal electrodes 2 formed therein; external electrodes 3 having inner layers 3a formed on the both end faces of the element 1 where end faces of the internal electrodes 2 are exposed and outer layers 3b formed so as to cover the inner layers 3a and the end portions of the four side walls of the element 1; and protection layers 4 covering the entire surface of the element 1 except for the portions thereof where the external electrodes 3 are formed.

The element 1 is formed by burning a multilayer structure consisting of ceramic layers 6 and the internal electrodes 2 alternately stacked at the same time. Only one end face of each of the internal electrodes 2 reaches one of the end faces of the element 1, and these end faces of the internal electrodes 2 expose at the right or left end faces of the element 1 alternately. These exposed end faces of the internal electrodes 2 are electrically connected with the inner layers 3a of the external electrodes 3.

The ceramic layers 6 of the element 1 are made of $SrTiO_3$ as a major ingredient. The content of such a major ingredient in a mixture forming the ceramic layers is preferably 95% or more, more preferably 97% or more. As minor ingredients of the mixture, $Nb_2O_5$, $Ta_2O_5$, $SiO_2$, $MnO_2$, $Sb_2O_3$, $Bi_2O_3$, $Co_2O_3$, CuO and the like may be used.

The internal electrodes 2 may be made of any known electrode materials. For example, a mixture containing Ni and the like as a major ingredient and $Li_2CO_3$, $Na_2CO_3$ and the like as a minor ingredient may be used. Among them, a mixture containing Ni as a major ingredient and $Li_2CO_3$ as a minor ingredient is preferably used.

The inner layers 3a of the external electrodes 3 may be made of any known electrode material. For example, Ni, Cu and the like are known. Among them, a mixture containing Ni as a major ingredient and $Li_2CO_3$ as a minor ingredient is preferably used. The thickness of the thickest portion of the inner layers 3a is preferably in the range of 10 to 15 µm. The outer layers 3b of the external electrodes 3 are made of materials such as Ag and Ag-Pd, for example. Among them, Ag is preferable. The thickness of the thickest portion of the outer layers 3b is preferably in the range of 30 to 60 µm. This two-layer structure of the external electrodes 3 provides an advantage in that reliability of the resultant electronic component can be improved.

The protection layer 4 is made of a metal oxide. Materials forming the metal oxide include: a metal such as Ni, Cu; and metal compounds (such as Ni compound, Cu compound) containing at least one oxide of Si, Ti, Al, Mg, and Zr. Among these materials, Ni and Ni compound containing at least one oxide of Si, Ti, Al, Mg, and Zr are preferable because the oxide thereof has an especially high resistance value and good chemical resistance. By having the protection layer made of a metal oxide, the element is effectively sealed (i.e., having excellent moisture resistance and chemical resistance, for example) and insulated. The resultant electronic component is provided with excellent mechanical strength and can be smoothly mounted.

The metal oxide preferably includes a vitreous substance such as lead glass. The content of the vitreous substance is preferably in the range of 1 to 10 g, more preferably in the range of 3 to 6 g for 100 ml of electroless metal plating solution.

The thickness of the protection layer 4 is preferably in the range of about 0.5 to about 5 µm, more preferably in the range of about 1 to about 3 µm. When the thickness of the protection layer 4 is less than about 0.5 µm, the uniformity of the thickness is not obtainable, and a hole may be generated in the protection layer 4. As a result, the moisture resistance of the resultant multilayer varistor may be insufficient. On the contrary, when the thickness of the protection layer 4 is more than about 5 µm, the element may break or crack due to a volumetric change of the metal of the protection layer 4 at the time of the oxidation of the metal. Further, re-oxidation of the metal oxide tends to become difficult.

Figure 2:
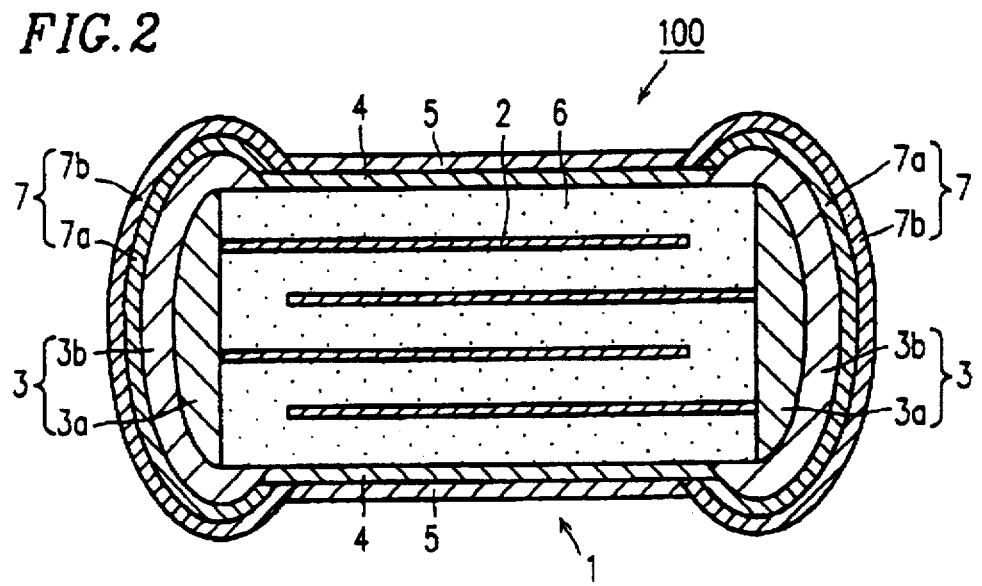
FIG. 2 is a schematic sectional view showing an alternative example of the electronic component of FIG. 1.

Preferably, as shown in FIG. 2, the multilayer varistor 100 may further include a glass layer 5 formed on the surface of the protection layer 4 and/or metal plating layers 7 covering the external electrodes 3. The glass layer 5 preferably includes a glass formation substance and a vitrifying agent. Examples of the glass formation substance include: silica compounds represented by $Si(OR^1)_4$ and $R^2_m Si(OH)_{4-m}$; titanium compounds represented by $Ti(OR^3)_4$ and $R^4_n Ti(OH)_{4-n}$; aluminum compounds represented by $Al(OR^5)_3$ and $R^6_q Al(OH)_{3-q}$; and mixtures thereof (wherein $R^1$ to $R^6$ individually denote alkyl groups having 1 to 3 carbon atom(s), m and n are individually 0 to 4, and q is 0 to 3). Examples of the vitrifying agent include oxides of Na, Li, K, Bi, B, and Pb. By forming such a specific glass layer, the sealing of the element is further enhanced. In the case where the metal plating layers are formed over the external electrodes 3, portions of the protection layer may be reduced due to hydrogen gas generated at the formation of the metal plating layers. The formation of the glass layer prevents reduction of the protection layer due to hydrogen gas.

The thickness of the glass layer 5 is preferably in the range of about 1 to about 3 µm, more preferably in the range of about 1.5 to about 2.5 µm. When the thickness of the glass layer 5 is less than about 1 µm, the uniformity of the thickness is not obtainable, and a hole or a scratch may be easily generated in the glass layer 5. As a result, the moisture resistance of the resultant multilayer varistor may be insufficient. On the contrary, when the thickness of the glass layer 5 is more than about 3 µm, the glass layer 5 may be peeled off or crack due to heat and/or shock.

Preferably, the glass layer 5 may contain a filler. Examples of the filler include: needle-like crystals of $Al_2O_3$, $TiO_2$, ZnO, SiC, $Si_3N_4$, and $SiO_2$; carbon fibers; and glass fibers. The crystals or fibers of the filler are preferably shaped as fine as possible. Specifically, they preferably have a length of about 5.0 µm or less and a diameter of about 1.0 µm or less. The size distribution of the filler is desirably as small as possible. The content of the filler may be preferably in the range of 0.1 to 5.0 parts by weight, more preferably in the range of 0.5 to 2.0 parts by weight for 100 parts by weight of the glass formation substance. By having such needle-like filler in the glass layer, both the thermal strength and mechanical strength of the glass layer are enhanced, thereby suppressing cracking and peeling off of the glass layer. The resultant electronic component can be smoothly mounted. Further, the bond strength between the protection layer and the glass layer eminently increases by the anchoring effect of the filler. The resultant electronic components provides excellent moisture resistance.

Preferably, the glass layer 5 may further contain a second filler containing at least one compound selected from $Bi_2O_3$ and $Sb_2O_3$. The content of the second filler may be preferably in the range of 0.1 to 5.0 parts by weight, more preferably in the range of 0.2 to 2.0 parts by weight for 100 parts by weight of the glass formation substance. The bond strength between the protection layer and the glass layer is eminently increased by the diffusion effect of the second filler in the glass layer.

Each of the metal plating layers 7 preferably has a two-layer structure composed of an inner metal plating layer 7a and an outer metal plating layer 7b. The inner metal plating layer 7a is made of Ni, Cu, and the like. Among them, Ni is preferable. The outer metal plating layer 7b is made of a solder, Sn, and the like. Among them, a solder is preferable. By covering the external electrodes 3 with the metal plating layers 7, the resultant multilayer varistor can be smoothly mounted.

Alternatively, the multilayer varistor 100 may include a resin layer, instead of the glass layer, on the protection layer 4, though this structure is not shown. Examples of the resin forming the resin layer include thermosetting resins such as silicone resins and epoxy resins. The thickness of the resin layer is preferably in the range of about 1 to about 3 µm, more preferably in the range of about 1.5 to about 2.5 µm, as in the case of the glass layer. By forming such a resin layer, the sealing of the element is further enhanced. In the case where the metal plating layers are formed over the external electrodes 3, portions of the protection layer may be reduced due to hydrogen gas generated at the formation of the metal plating layers. The formation of the resin layer prevents reduction of the protection layer due to hydrogen gas.

Figure 3:
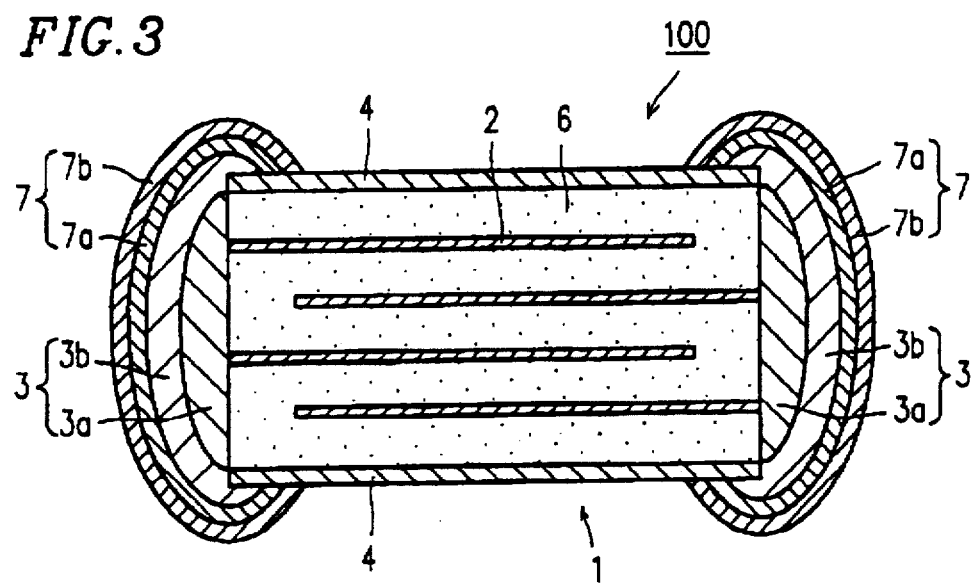
FIG. 3 is a schematic sectional view showing another example of an electronic component according to the present invention.
Figure 4:
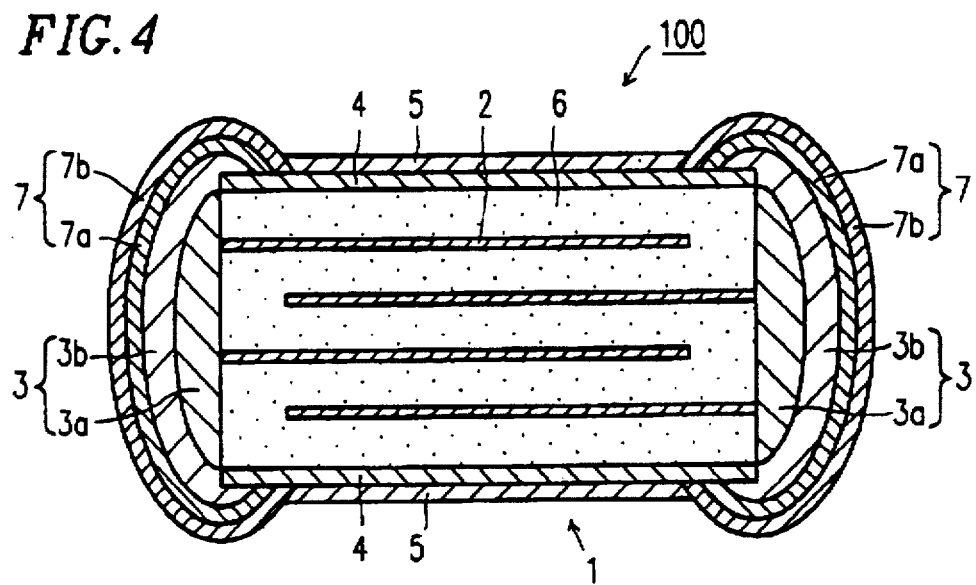
FIG. 4 is a schematic sectional view showing an alternative example of the electronic component of FIG. 3.

FIG. 3 shows another example of the multilayer varistor according to the present invention. A multilayer varistor 100 of this example includes: an element 1 of a rectangular parallelepiped shape having internal electrodes 2 formed therein; protection layers 4 covering the entire surface of the element 1 except for both end faces thereof; and external electrodes 3 having inner layers 3a formed on the end faces of the element 1 and outer layers 3b formed so as to cover the inner layers 3a and the end portions of the protection layer 4. The multilayer varistor of this example, as in the multilayer varistor shown in FIG. 1, may further include a glass layer 5 and/or metal plating layers 7 as shown in FIG. 4.

Figure 5:
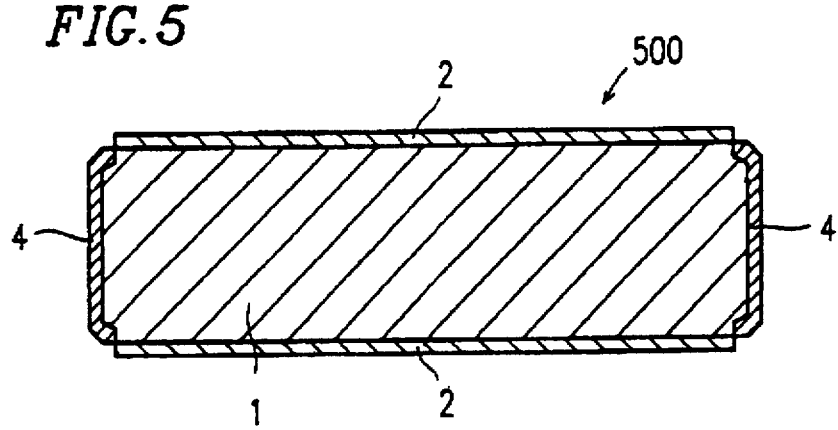
FIG. 5 is a schematic sectional view showing still another example of an electronic component according to the present invention.

FIG. 5 shows a disk-shaped thermistor as another preferred embodiment of the electronic component of the present invention. Only components specific to the thermistor are described herein for simplification.

Referring to FIG. 5, a thermistor 500 includes a disk-shaped element 1, electrodes 2 formed on the top and bottom surfaces of the element 1, and protection layers 4 formed on the entire surface of the element 1 except for the portions thereof where the electrodes 2 are formed.

Any known thermistor element may be used for the element 1. Typically, an element made of a composite material of Mn-Ni-Cu, Mn-Ni-Fe, Mn-Ni-Al, or the like is used.

Any known thermistor electrode may be used for the electrodes 2. Typically, an electrode made of Ag, Ag-Pd, or the like is used.

The electronic components of specific shapes and usages were described hereinbefore for simplification. However, the present invention can be applied to any shapes of elements and used for various types of electronic components other than those described above. For example, the present invention is also applicable to capacitors, multilayered thermistors, ceramistors, varistors, ferrites, ceramic substrates, and piezoelectric elements, in addition to the multilayer varistors and the disk-shaped thermistors as described above. Furthermore, the present invention is applicable to any shapes of electronic components (for example, multilayered type, disk-shaped type).

Figure 6:
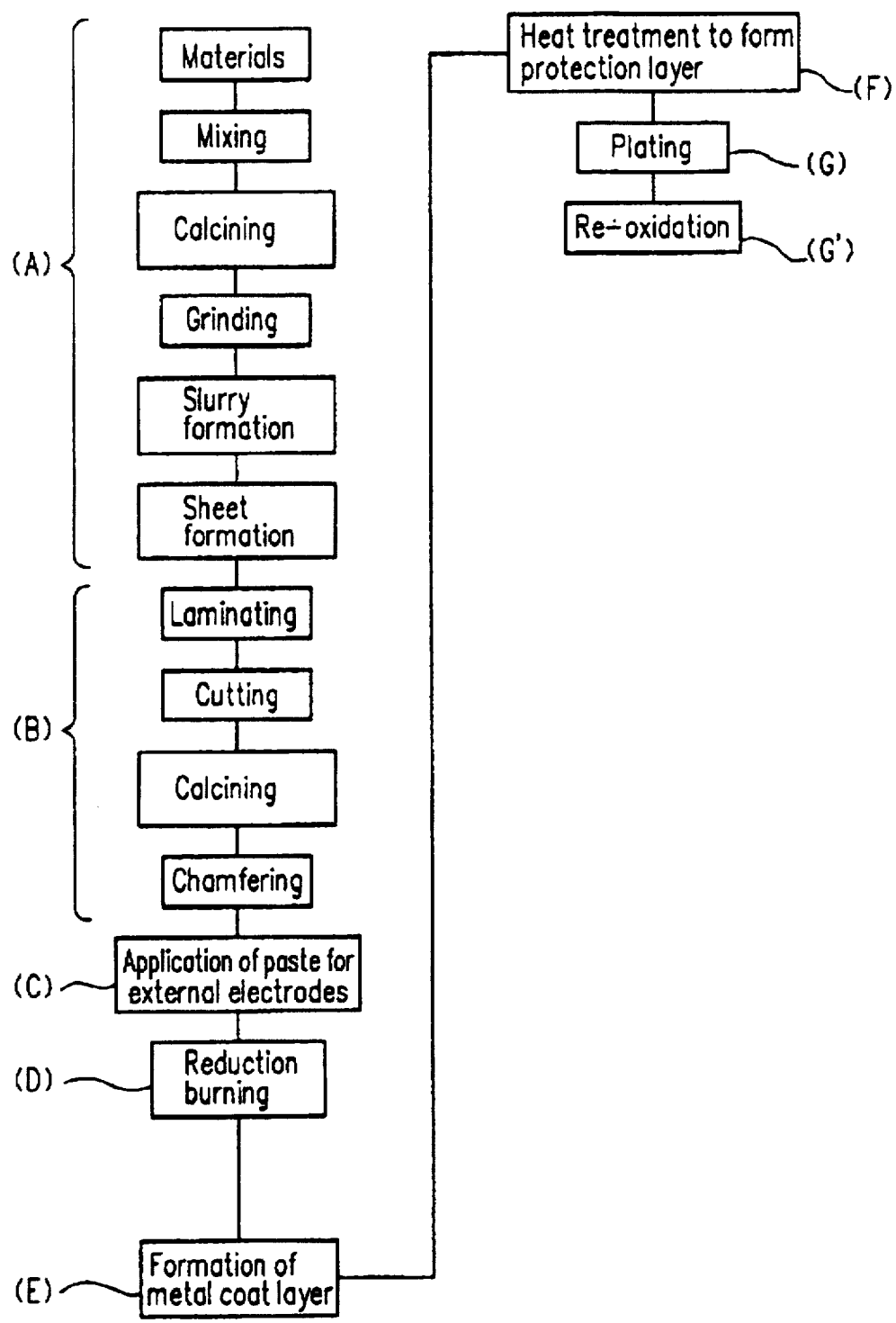
FIG. 6 is a flowchart showing an example of the method for fabricating an electronic component according to the present invention.

Next, a preferred example of the method for fabricating an electronic component according to the present invention will be described with reference to the flowchart of FIG. 6.

First, the element is prepared by a known method. The fabrication of the element is not a constituent of the present invention, but any known fabrication method may be adopted. For example, in the case of the multilayer varistor shown in FIG. 1, the element is fabricated in the following manner (steps (A) and (B)).

A ceramic sheet is first fabricated in the following procedure (step (A)): The above-mentioned ceramic materials for the ceramic layers are mixed at a predetermined ratio. The mixture is calcined and then ground into powders. The average diameter of the powders is preferably 1.0 μm or less, more preferably 0.6 to 0.8 μm. The resultant powders are mixed with an organic binder and an organic solvent so as to form a slurry. Examples of the organic binder include butyral resins, cellulose resins, and the like. Examples of the organic solvent include butyl acetate, dibutyl phthalate (DBP) and the like. The resultant slurry is formed into a sheet by a known method such as a doctor-blade method and a reverse-rolls method, and the sheet is then cut to form ceramic sheets for the ceramic layers. The thickness of each ceramic sheet is preferably in the range of 20 to 50 μm, more preferably in the range of 25 to 30 μm.

Then, the element is fabricated in the following procedure (step (B)): A conductive paste is prepared from the above-mentioned internal electrode formation materials. Using the paste, the internal electrodes of a desired shape are formed on the ceramic sheets by screen printing, gravure printing, or the like. In the case of the multilayer varistor shown in FIG. 1, while one end face of each internal electrode extends to one end face of the ceramic sheet, the other end face thereof does not reach the other end face of the ceramic sheet but is located between the ends of the ceramic sheet. Such ceramic sheets and the internal electrodes are stacked alternately until a predetermined number of layers are stacked in such a manner that the end faces of the internal electrodes extend to the right or left end faces of the ceramic sheets alternately. Each of the top and bottom surfaces of the thus-obtained multilayer structure is covered with a dummy ceramic sheet. The resultant structure is heated, pressed, and cut into a predetermined shape. The multilayer structure cut into the predetermined shape is decarbonized, calcined and chamfered. The organic binder and the organic solvent are removed at the decarbonization and calcination. Thus, production of the element is completed. The calcination is conducted at a temperature preferably in the range of 1000° to 1200° C., more preferably in the range of 1000° to 1100° C. for preferably 1 to 5 hours, more preferably 1 to 2 hours. The heating rate is preferably in the range of 10° to 50° C./hour.

Thereafter, a paste for the formation of the external electrodes is applied to the end faces of the thus-obtained element to a predetermined thickness (step (C)), and then burned for reduction (step (D)). This burning is conducted at a temperature preferably in the range of 1200° to 1300° C., more preferably in the range of 1200° to 1250° C. for preferably 1 to 10 hours, preferably 2 to 5 hours. The heating rate is preferably about 200° C./hour.

Then, a metal coat layer is formed on the entire surface of the element except for the portions thereof where the external electrodes are formed to a predetermined thickness (step (E)). The metal coat layer, which is to be the protection layer by heat treatment, may be formed by electroless metal plating, vapor deposition, sputtering, dipping, thermal spraying, printing, and the like. Among these methods, electroless metal plating is preferable, and an electroless metal plating using either Ni or Cu as a major component is more preferable. The dip of the element into a metal plating solution should preferably be conducted after the surface of the element is sufficiently cleaned with pure water or ion exchange water for the removal of impurities. The metal plating solution preferably contains glass powders or powders including at least one material selected from the group consisting of compounds of Si, Ti, Al, Mg, and Zr which form oxides by heat treatment. Such powders are preferably uniformly dispersed in the metal plating solution. For the uniform dispersion of the powders, the metal plating solution should be agitated vigorously while the powders are added thereto. The content of the powders is preferably in the range of 1 to 10 g, more preferably in the range of 3 to 6 g for 100 ml of the metal plating solution. The existence of the powders in the metal plating solution ensures the formation of the protection layer having high reduction resistance or high mechanical strength.

The metal coat layer is selectively formed on the surface of the element except for the external electrode formation portions by using resists, masking, and the like. Among these methods, using resists is preferable. Such resists may be made of pastes of polysaccharides such as ethyl cellulose, resins such as polyvinyl alcohol and polyvinyl acetate, and the like. Among them, pastes are preferable. The resists are preferably colored with a dye or a pigment so that the uniformity of the resultant resists can be easily observed. The resists are carbonized by heating at the formation of the protection layer to be described later, and thus can be easily removed. The carbonized resists are removed by ultrasonic cleaning and barrel polishing, for example.

In the case where the two-layer external electrodes are to be formed, the inner and outer layers of the external electrodes and the metal coat layer are formed in the following procedure: (i) A paste for the formation of the inner layers of the external electrodes is applied to the end faces of the element obtained at step (B) to a predetermined thickness, and then burned for reduction; (ii) A paste for the formation of the outer layers of the external electrodes is applied to a predetermined thickness; and (iii) the metal coat layer, which is to be the protection layer by heat treatment, is formed on the entire surface of the element except for the portions where the external electrodes have been formed. Alternatively, the metal coat layer may be formed on the entire surface of the element except for the portions where the inner layers of the external electrodes have been formed after step (i), followed by the formation of the outer layers of the external electrodes.

Subsequently, the metal coat layer is oxidized by heat treatment so as to form the protection layer made of an metal oxide (step (F)). The heat treatment is conducted at a temperature preferably in the range of 700° to 850° C., more preferably in the range of 750° to 850° C. for preferably 10 minutes to 2 hours, more preferably 30 minutes to 1 hour.

Preferably, the metal plating layers are formed on the element after the formation of the protection layer (step (G)). Further, the protection layer is preferably re-oxidized after the formation of the metal plating layers (step (G')). The re-oxidation is conducted, for example, by dipping the element with the protection layer formed thereon in an alkaline solution of hydrogen peroxide or any other alkaline solution that does not affect the element. An example of the alkaline solution of hydrogen peroxide is a mixed solution of 30% hydrogen peroxide solution and 28% aqueous ammonia solution in the volume ratio of 10:1. The duration of dip is preferably 1 to 10 minutes, more preferably 1 to 2 minutes. By this re-oxidation, the reduction resistance of the protection layer is further enhanced. Since the solution used for the re-oxidation has a cleaning effect, it can also be used as the cleaning solution after the metal plating.

After the re-oxidation, the resultant structure is preferably chamfered. Even if the protection layer is undesirably formed on the outer layers of the external electrodes, the portions of the protection layer formed on the outer layers of the external electrodes can be selectively removed by chamfering. Thus, an electronic component where the protection layer is formed only on a desired portion can be obtained. For example, for the outer layers made of Ag, since the ductility of Ag is high, the coefficient of friction between the outer layers of the external electrodes and the protection layer is large. This facilitates the grinding of the portions of the protection layer on the outer layers at the chamfering. As a result, only the portions of the protection layer on the outer layers can be effectively removed.

Preferably, the glass layer may be formed on the surface of the protection layer formed on the surface of the element. Resists and the like may be used for the selective formation of the glass layer on the surface of the protection layer formed on the surface of the element, as in the case of the formation of the protection layer. The glass layer may be formed by dipping, thermal spraying, printing, and the like. In the dipping, for example, the element with the protection layer formed thereon is dipped in a solution containing the above-mentioned glass formation substance and then heat-treated. One representative example of such a dipping solution is an alkoxide glass solution. The dipping of the element into the solution should preferably be conducted after the surface of the element has been sufficiently cleaned with pure water or ion exchange water for the removal of impurities. The water used for the cleaning should preferably be removed completely before the dipping of the element so as to prevent the solution from being hydrolyzed. The duration of dipping is preferably in the range of 1 to 10 minutes, more preferably in the range of 2 to 5 minutes. After the dipping, drops of solution attaching to the element may be removed by centrifugation. Then, the heat treatment is conducted at a temperature preferably in the range of 200° to 500° C., more preferably in the range of 250° to 400° C. for preferably 10 minutes to 2 hours, more preferably 30 minutes to 1 hour. The heat treatment is conducted preferably by putting the surface of the element in contact with powders containing at least one material selected from the group consisting of compounds containing Si, Ti, Al, Mg, and Zr (for example, by burying the element among the powders) so as to heat the element. The purity of the powders is preferably 90% or more, more preferably 95% or more. This heating of the element by the contact with the powders is effective in suppressing the diffusion reaction between the protection layer and the glass layer and preventing the attachment of the element with other elements at the formation of the glass layer. The above process of dipping and heating is repeated preferably 1 to 3 times, more preferably 2 to 3 times. By thus repeating the dipping and heating process, a more uniform glass layer can be formed. As a result, the sealing of the element is further enhanced.

Alternatively, the resin layer, instead of the glass layer, may be formed on the protection layer formed on the surface of the element. The resin layer is formed, for example, by dipping the element with the protection layer formed thereon in a solution containing a resin component and then heat-treating so as to harden the resin component. A representative example of the immersion solution is a solution containing 100 parts by weight of a resin component and 200 parts by weight of an organic solvent. The duration of dipping is preferably in the range of 5 to 30 minutes, more preferably in the range of 5 to 10 minutes. The heat treatment is conducted at a temperature preferably in the range of 100° to 350° C., more preferably in the range of 150° to 300° C. for preferably 10 minutes to 2 hours, more preferably 10 to 30 minutes.

According to the present invention, an electronic component having a protection film made of a metal oxide is obtained. The protection layer is very rigid and solid because the volume of the metal oxide increases at the formation thereof by the oxidation of a metal. Further, the protection layer bonds to the surface of the element not only physically but also by chemical reaction between a portion of the protection layer and the surface portion of the element. As a result, the electronic component of the present invention has the following features: (I) The sealing of the element is significantly high, ensuring the protection thereof from water, gas, acid, alkali, and the like. Accordingly, even if the element itself is porous, high moisture resistance and chemical resistance can be obtained. (II) The insulation of the element is significantly high, and thus surface leak and migration at the external electrode are effectively reduced. (III) The resultant electronic component has significantly excellent mechanical strength and shock resistance. As a result, occurrence of damages such as breaks and cracks and strains is prevented. (IV) The resultant electronic component can be smoothly mounted. (V) The bond strength between the element and the protection layer is significantly high. Thus, the protection layer is prevented from being peeled off and cracking due to shock and heat.

EXAMPLES

The present invention is now specifically described by way of examples though it is not limited to these examples.

Example 1

Figure 7:
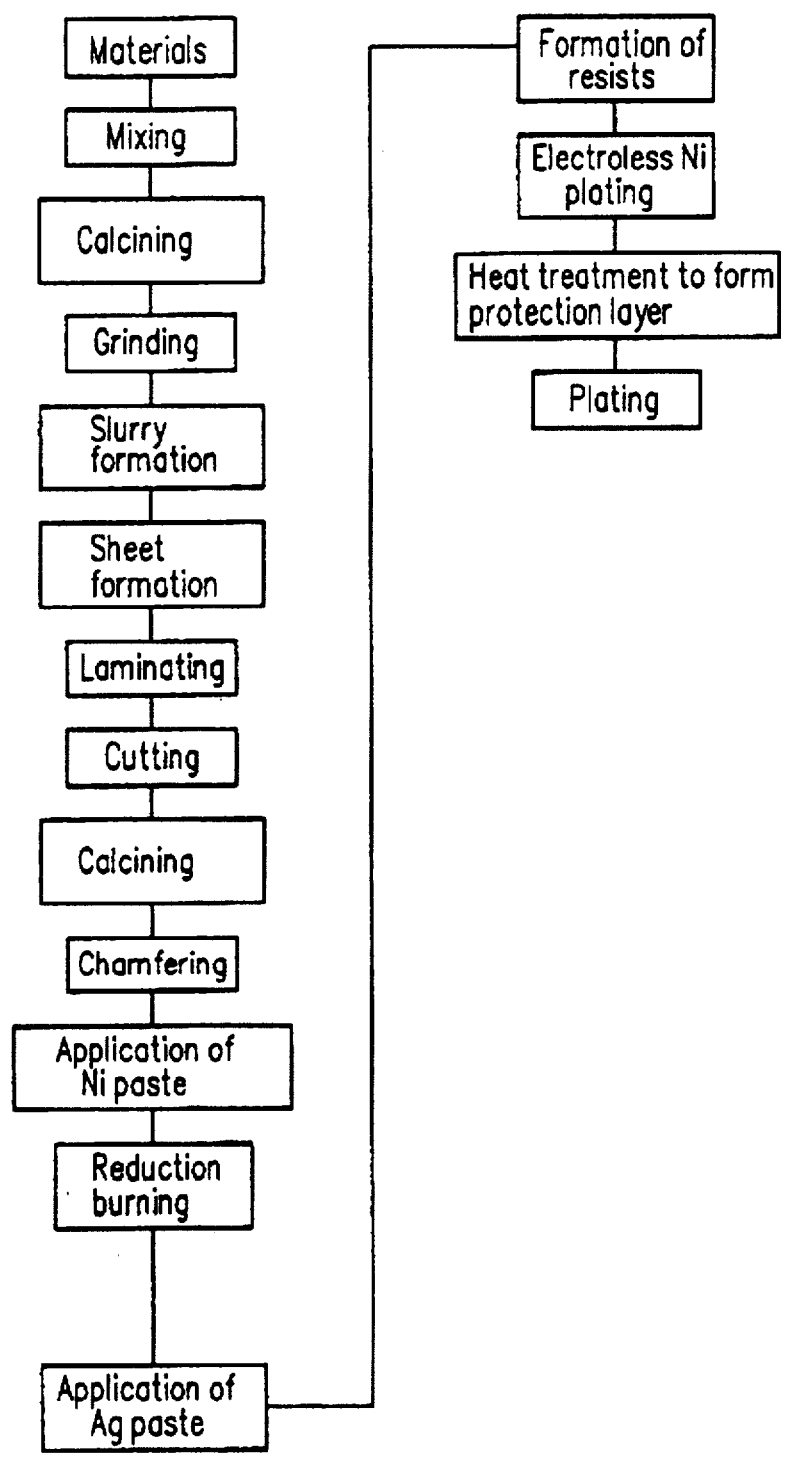
FIG. 7 is a flowchart showing a fabrication method of Example 1.

A multilayer varistor as shown in FIG. 1 was fabricated according to the flowchart shown in FIG. 7.

First, ceramic sheets for the ceramic layers were formed in the following procedure: $SrTiO_3$ (98.6 mol%), $Nb_2O_5$ (0.2 mol%), $Ta_2O_5$ (0.2 mol%), $SiO_2$ (0.5 mol%), and $MnO_2$ (0.5 mol%) were mixed and ground in a ball mill for 20 hours, so as to obtain powders having an average particle diameter of about 1.0 μm or less. For 100 parts by weight of the resultant powders, 10 parts by weight of a butyral resin as the organic binder, 70 parts by weight of butyl acetate as the organic solvent, and 5 parts by weight of dibutyl phthalate (DBP) as the plasticizer were mixed so as to form a slurry. The slurry was formed into a sheet by the reverse-rolls method and cut, so as to obtain the ceramic sheets having a thickness of about 30 μm.

A conductive paste containing Ni as a major component and $Li_2CO_3$ as a minor component was prepared. The conductive paste was applied to the ceramic sheets by screen printing so as to form the internal electrodes 2 on the ceramic sheets. Each of the internal electrodes 2 was printed so that one end face thereof extends to an end face of the ceramic sheet, while the other end face thereof does not reach the other end face of the ceramic sheet but is located anywhere on the ceramic sheet. Such ceramic sheets and the internal electrodes were stacked alternately until a predetermined number of layers were stacked in such a manner that the end faces of the internal electrodes extend to the right or left end faces of the ceramic sheets alternately. Each of the top and bottom surfaces of the thus-obtained multilayer structure was covered with a dummy ceramic sheet. The resultant structure was heated, pressed, and cut into a predetermined shape. The multilayer structure cut into the predetermined shape was calcined at 1100° C. for 2 hours and chamfered. The organic binder and the organic solvent were removed at the calcination. Thus, the element 1 was completed.

Thereafter, an Ni paste for the formation of the inner layers 3a of the external electrodes was applied to the end faces of the thus-obtained element 1, and the element with the Ni paste was burned at 1250° C. for 5 hours for reduction. Then, an Ag paste for the formation of the outer layers 3b of the external electrodes was applied to the inner layers and the end portions of the four walls of the element.

Resists made of a paste were formed on the thus-obtained outer layers 3b of the external electrodes. Then, a metal coat layer was formed on the entire surface of the element except for the resist-formed portions to a thickness of 1.0 μm by electroless Ni plating. The element with the metal coat layer formed thereon was then heat-treated at 850° C. for 30 minutes, so as to form the protection layer 4. The resists, which had been carbonized at the heat treatment, were removed by ultrasonic cleaning. Thereafter, the Ni inner plating layers 7a and the solder outer plating layers 7b were formed on the outer layers 3b of the external electrodes.

The multilayer varistor of Example 1 has a very rigid and solid protection layer. This is formed because the volume of the metal oxide increases at the formation thereof by the oxidation of a metal. Further, the protection layer bonds to the surface of the element not only physically but also by chemical reaction between a portion of the protection layer and the surface portion of the element. As a result, the electronic component of Example 1 has the following features.

(I) The sealing of the element is significantly high, ensuring the protection thereof from water, gas, acid, alkali, and the like. Accordingly, the element is excellent in moisture resistance and chemical resistance.

(II) The insulation of the element is significantly high, and thus surface leakage and migration at the external electrode are effectively reduced.

(III) The resultant electronic component has significantly excellent mechanical strength and shock resistance. As a result, occurrence of damage such as breaks and cracks and strains is prevented.

(IV) The resultant electronic component can be smoothly mounted.

(V) The bond strength between the element and the protection layer is significantly high. Thus, the protection layer is prevented from being peeled off and cracking due to shock and heat.

Example 2

Figure 8:
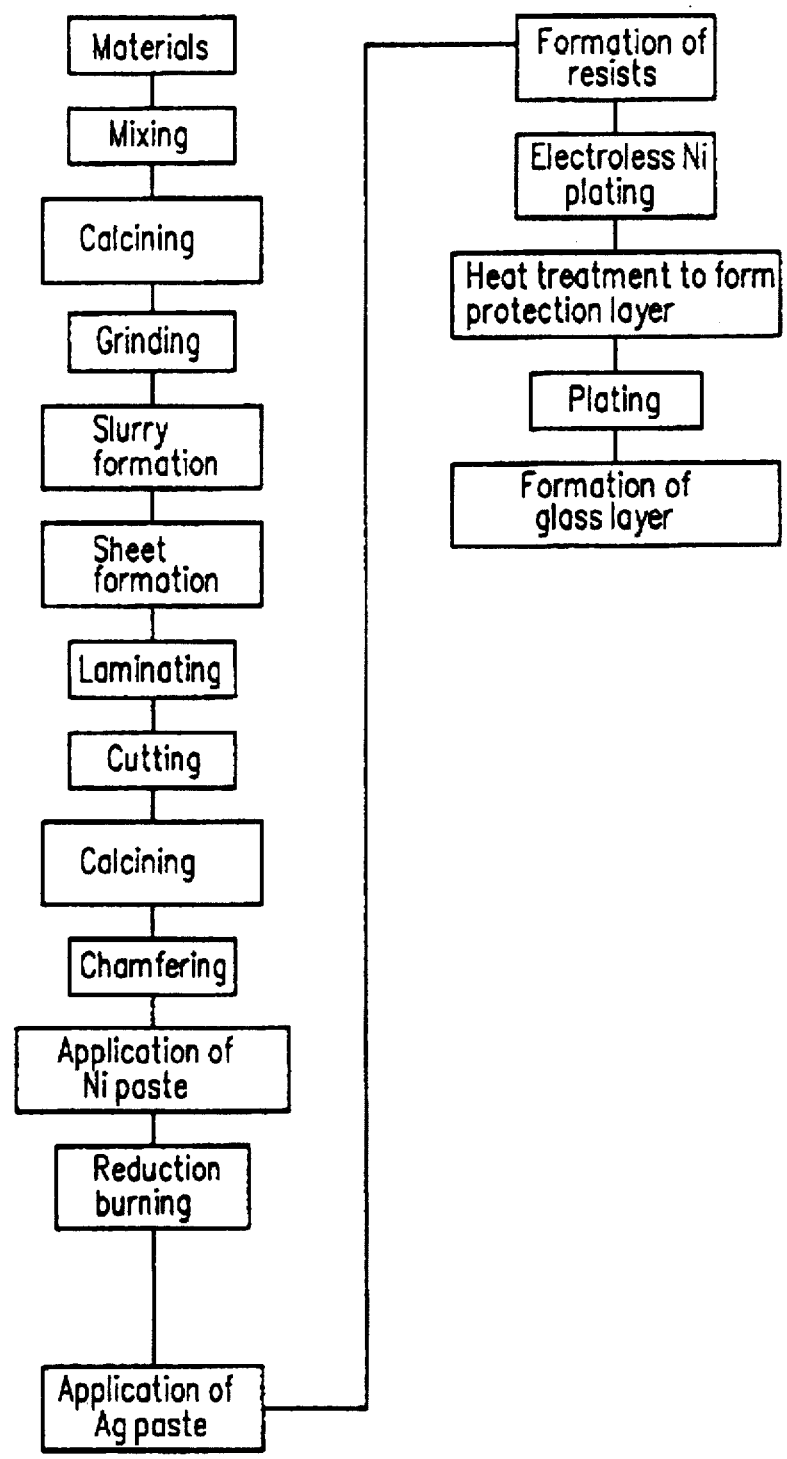
FIG. 8 is a flowchart showing a fabrication method of Example 2.

A multilayer varistor as shown in FIG. 2 was fabricated according to the flowchart shown in FIG. 8. Basically, the varistor was fabricated in the same manner as that described in Example 1 except that a glass layer was additionally formed.

Specifically, the element with the protection layer 4 formed thereon was dipped in an alkoxide glass solution (OCD series, manufactured by Tokyo Ohka Kogyo Co. LTD.) for 5 minutes. The element was then removed from the solution, and heated at 850° C. for 30 minutes by putting the element in contact with powders containing $SiO_2$. Thus, the glass layer 5 was formed. The thus-formed glass layer 5 not only bonds to the surface of the protecting layer 4, but also partially intrudes into the protection layer 4. Accordingly, the bond strength between the protection layer 4 and the glass layer 5 is significantly high.

Because the multilayer varistor of Example 2 has the glass layer 5 formed on the protection layer 4, the features (I) to (V) described in Example 1 were obtained more effectively than in the case of Example 1. Especially, even when the multilayer varistor is immersed in a gas or a solution with high reduction property, the metal oxide constituting the protection layer is prevented from being reduced thanks to the covering of the glass layer. Thus, the element can be further effectively blocked from outside.

Example 3

Figure 9:
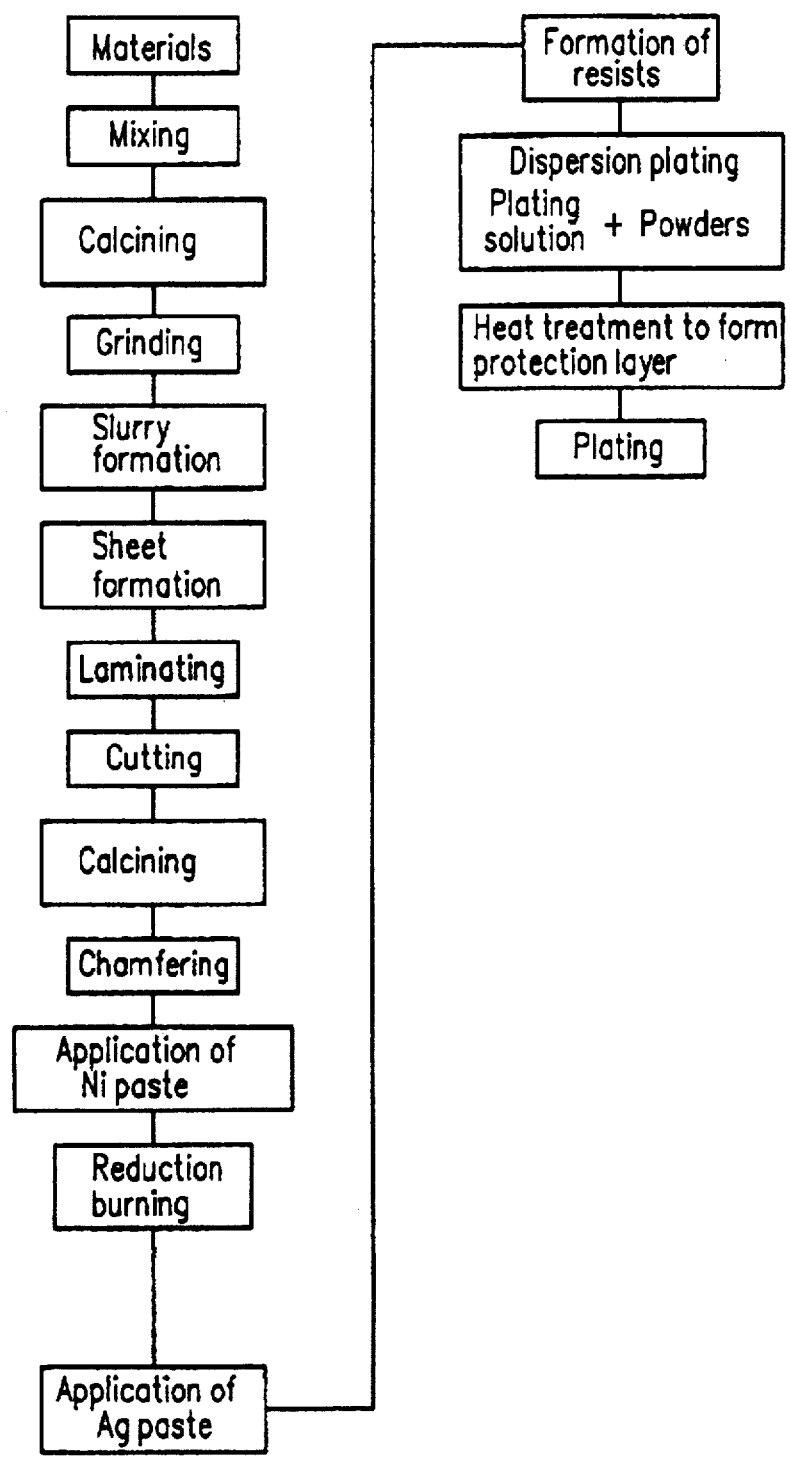
FIG. 9 is a flowchart showing a fabrication method of Example 3.

A multilayer varistor as shown in FIG. 1 was fabricated according to the flowchart shown in FIG. 9. Basically, the varistor was fabricated in the same manner as that described in Example 1 except that 5 g of $Al_2O_3$ powders were dispersed in 100 ml of an electroless metal plating solution for the formation of the metal coat layer.

As a result, in addition to the features (I) to (V) described in Example 1, the resultant multilayer varistor of Example 3 has the following feature: because the protection layer 4 contains $Al_2O_3$ powders, it shows excellent reduction resistance.

Example 4

Figure 10:
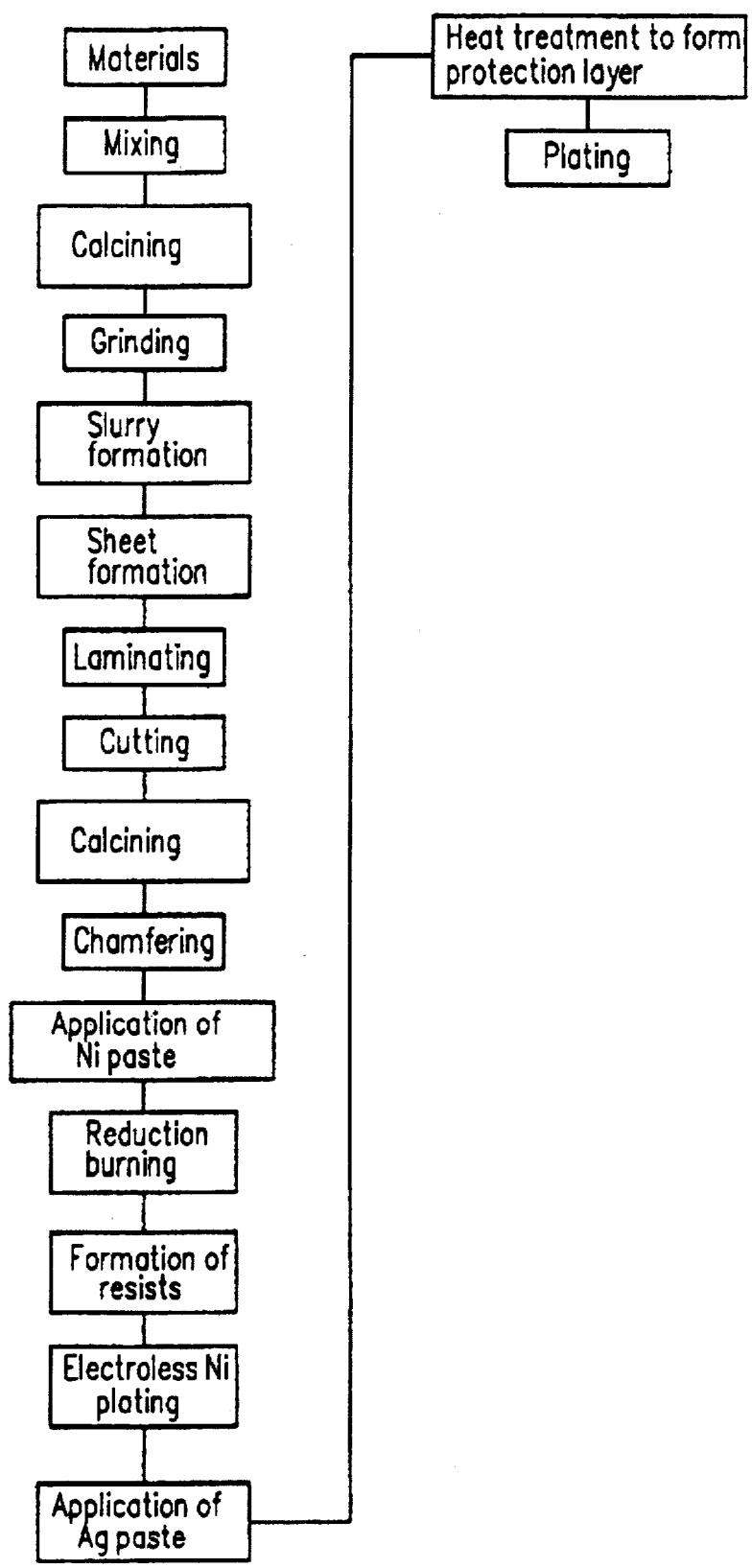
FIG. 10 is a flowchart showing a fabrication method of Example 4.

A multilayer varistor as shown in FIG. 3 was fabricated according to the flowchart shown in FIG. 10.

The element 1 was fabricated in the same manner as that described in Example 1. An Ni paste for the formation of the inner layers 3a of the external electrodes was applied to the end faces of the element 1 and then burned at 1250° C. for 5 hours for reduction. Thereafter, resists made of a paste were formed on the inner layers 3a of the external electrodes. Then, the metal coat layer was formed on the entire surface of the element except for the resist-formed portions to a thickness of 1.0 μm by electroless Ni plating. After the resists were removed, an Ag paste for the formation of the outer layers 3b of the external electrode was applied to the surfaces of the inner layers 3a and portions of the metal coat layer. The resultant element was heat-treated at 850° C. for 30 minutes. Thus, the protection layer 4 was formed. Thereafter, the Ni inner plating layers 7a and the solder outer plating layers 7b were formed on the outer layers 3b of the external electrodes.

The multilayer varistor of Example 4 has a very rigid and solid protection layer. This is formed because the volume of the metal oxide increases at the formation thereof by the oxidation of a metal. Further, the protection layer bonds to the surface of the element not only physically but also by chemical reaction between a portion of the protection layer and the surface portion of the element. As a result, the multilayer varistor of Example 4 has the following features.

(I) The sealing of the element is significantly high, ensuring the protection thereof from water, gas, acid, alkali, and the like. Accordingly, the element is excellent in moisture resistance and chemical resistance.

(II) The insulation of the element is significantly high, and thus surface leakage and migration at the external electrode are effectively reduced.

(III) The resultant electronic component has significantly excellent mechanical strength and shock resistance. As a result, occurrence of damage such as breaks and cracks and strains is prevented.

(IV) The resultant electronic component can be smoothly mounted.

(V) The bond strength between the element and the protection layer is significantly high. Thus, the protection layer is prevented from being peeled off and cracking due to shock and heat.

Further, in the multilayer varistor of Example 4, the protection layer is formed on the entire surface of the element except for the portions thereof where the inner layers 3a of the external electrodes have been formed. Accordingly, the following feature can be additionally obtained.

(VI) Migration between the outer layers 3b of the external electrode and the internal electrodes 2 can be significantly reduced.

Example 5

Figure 11:
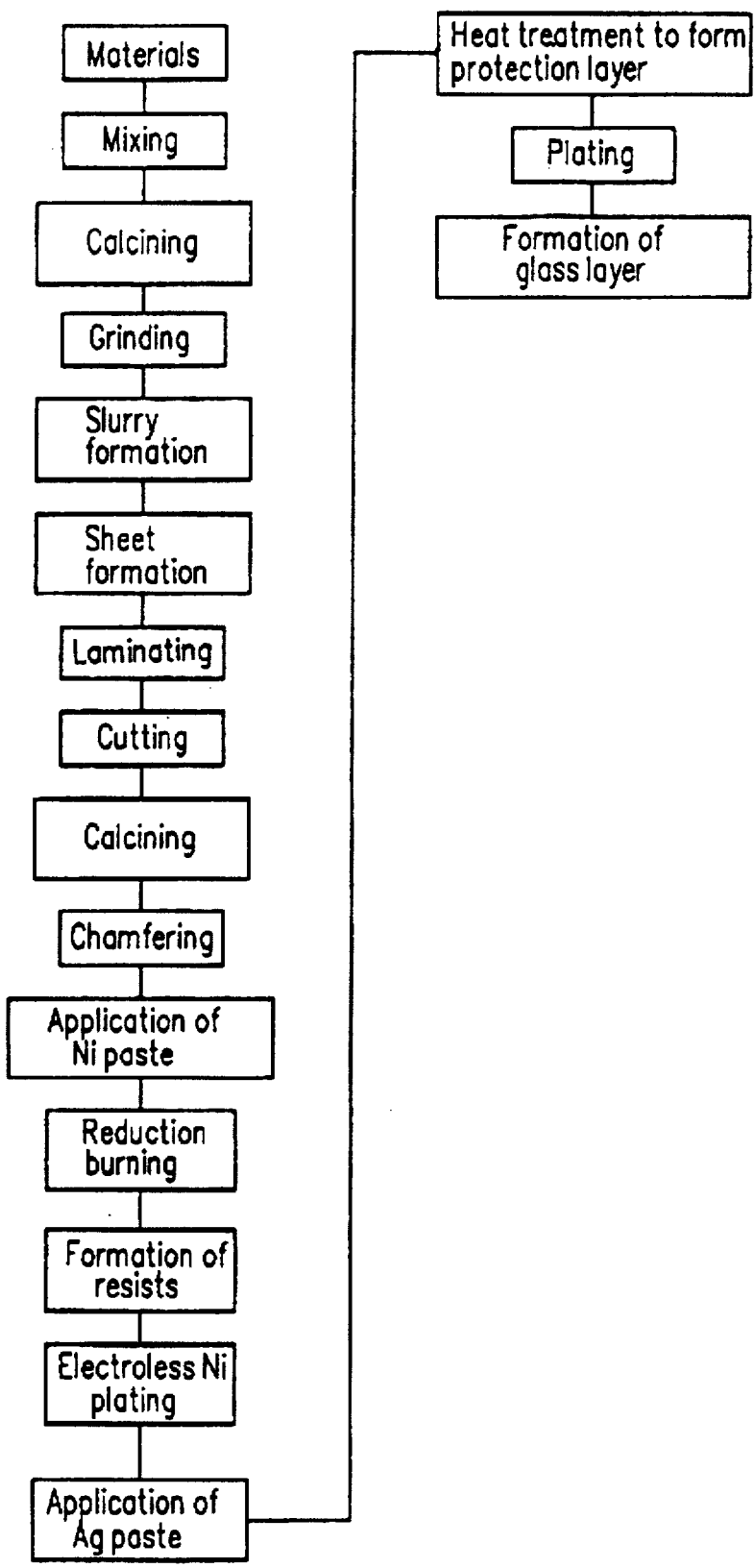
FIG. 11 is a flowchart showing a fabrication method of Example 5.

A multilayer varistor as shown in FIG. 4 was fabricated according to the flowchart shown in FIG. 11. Actually, the varistor was fabricated in the same manner as that described in Example 4 except that the glass layer was additionally formed.

Specifically, the element with the protection layer 4 formed thereon was immersed in an alkoxide glass solution (OCD series, manufactured by Tokyo Ohka Kogyo Co. LTD.) for 5 minutes. The element was then removed from the solution, and heated at 850° C. for 30 minutes by putting the element in contact with powders containing $SiO_2$. Thus, the glass layer 5 was formed. The thus-formed glass layer 5 not only bonds to the surface of the protecting layer, but also partially intrudes into the protection layer 4. Accordingly, the bond strength between the protection layer 4 and the glass layer 5 is significantly high.

Because the multilayer varistor of Example 5 has the glass layer 5 formed on the protection layer 4, the features (I) to (V) described in Example 4 were obtained more effectively than in the case of Example 4. Especially, even when the multilayer varistor is immersed in a gas or a solution with high reduction property, the metal oxide constituting the protection layer is prevented from being reduced thanks to the covering of the glass layer. Thus, the element can be further effectively blocked from outside.

Example 6

Figure 12:
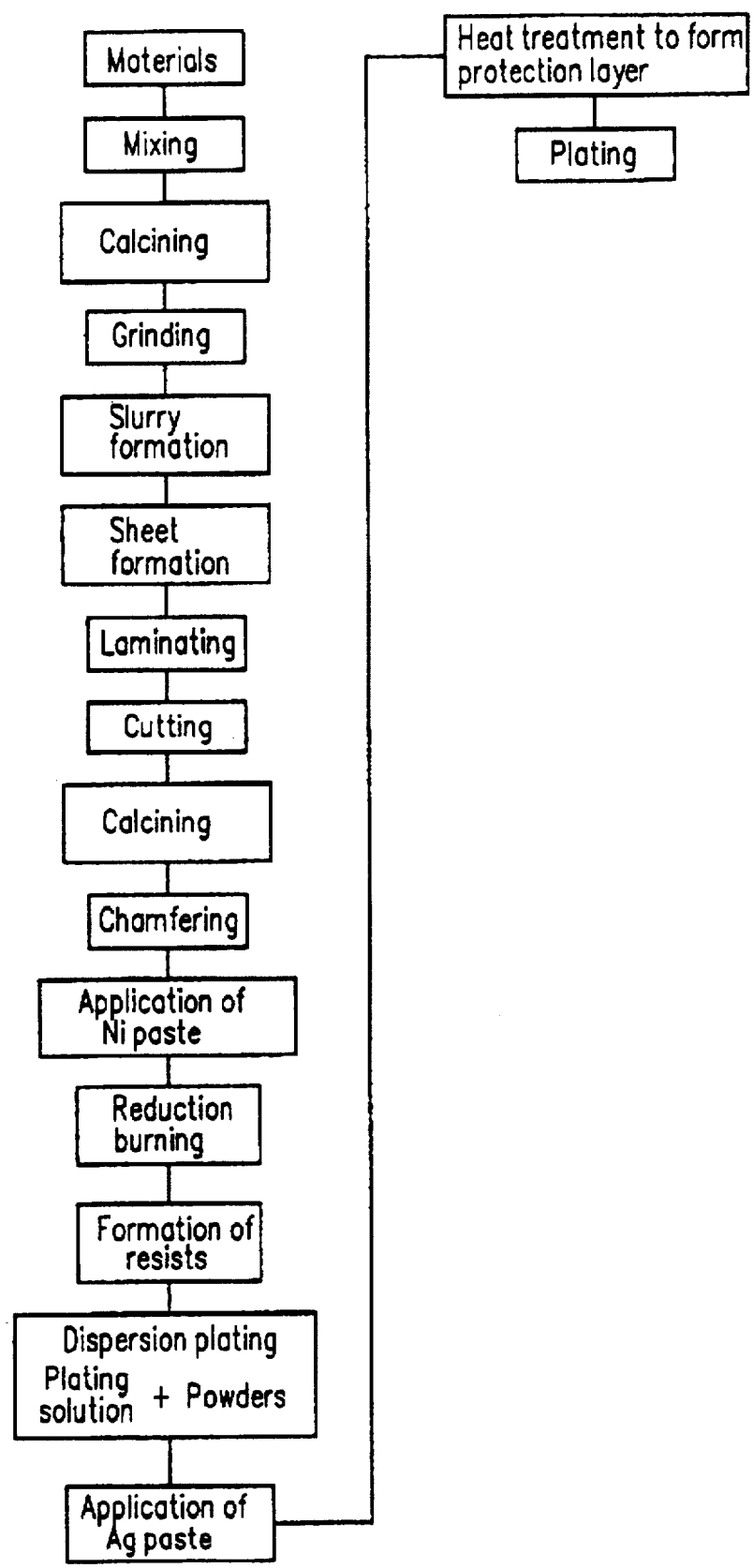
FIG. 12 is a flowchart showing a fabrication method of Example 6.

A multilayer varistor as shown in FIG. 3 was fabricated according to the flowchart shown in FIG. 12. Actually, the varistor was fabricated in the same manner as that described in Example 4 except that 5 g of $Al_2O_3$ powders were dispersed in 100 ml of an electroless metal plating solution for the formation of the metal coat layer.

As a result, in addition to the features (I) to (V) described in Example 4 the resultant multilayer varistor of Example 6 has the following feature: because the protection layer 4 contains $Al_2O_3$ powders, it shows excellent reduction resistance.

Comparative Example 1

Figure 13:
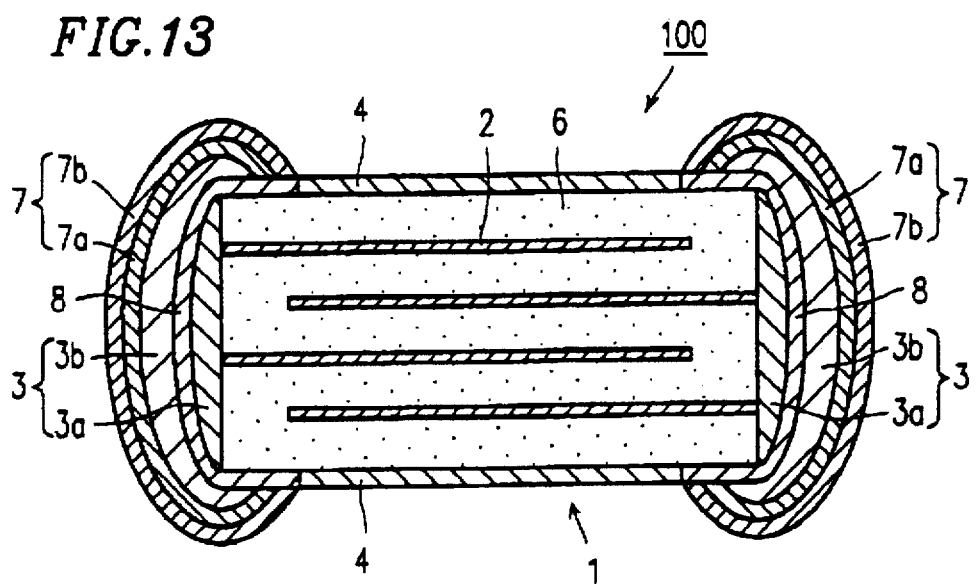
FIG. 13 is a schematic sectional view showing an electronic component of a comparative example.
Figure 14:
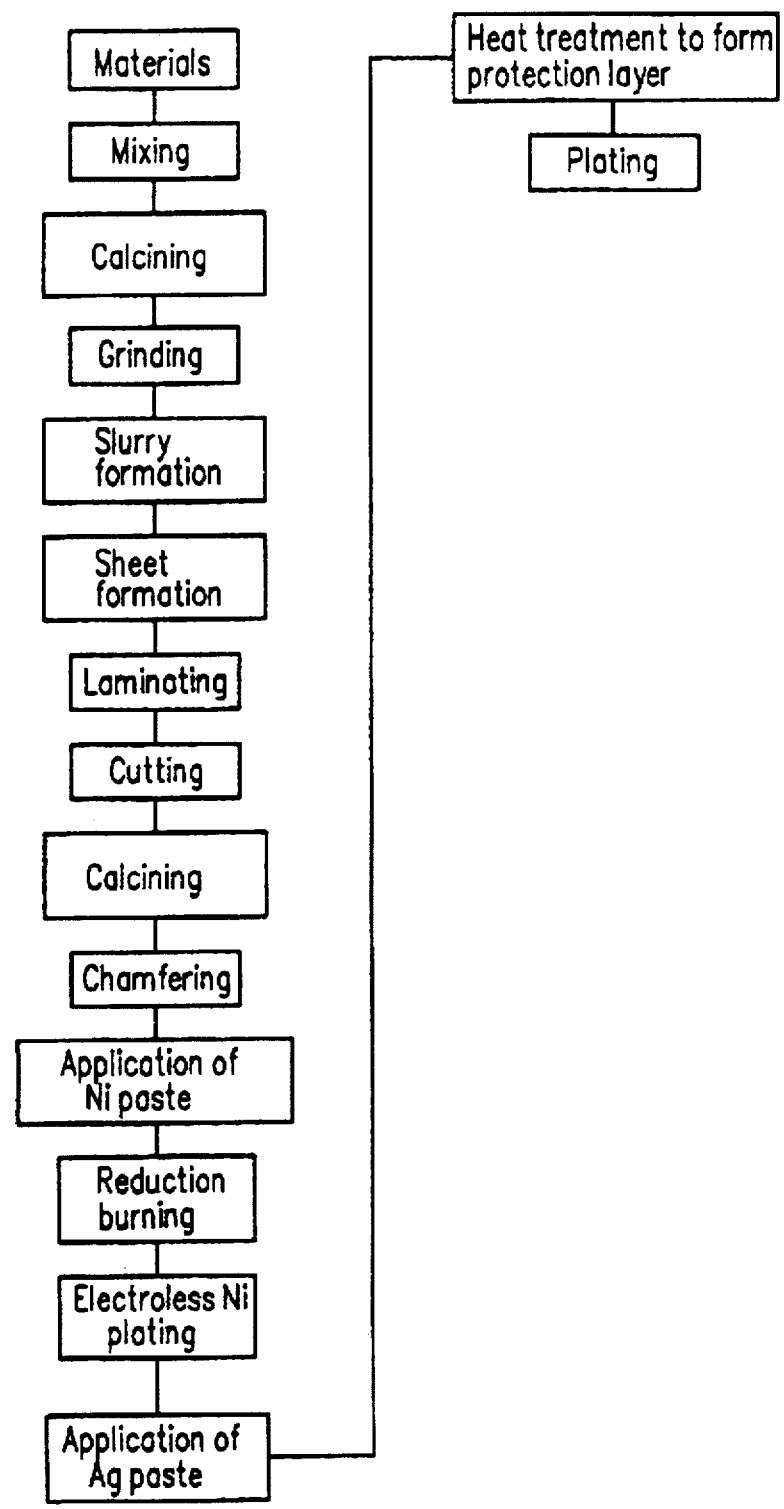
FIG. 14 is a flowchart showing a fabrication method of the electronic component of FIG. 13.

A multilayer varistor as shown in FIG. 13 was fabricated according to the flowchart shown in FIG. 14. The varistor includes a metal coat layer formed on the end faces and the end portions of the four walls of the element.

The element 1 was formed in the same manner as that described in Example 1. An Ni paste for the formation of the inner layers 3a of the external electrodes was applied to the end faces of the element 1 and then burned at 1250° C. for 5 hours for reduction. Thereafter, a metal coat layer was formed on the entire surface of the element with the inner layers 3a formed thereon to a thickness of 1.0 μm by electroless Ni plating. Then, an Ag paste for the formation of the outer layers 3b of the external electrodes was applied to the end faces of the element and the end portions of the four walls of the element, so as to partly cover the metal coat layer. The resultant element was heat-treated at 850° C. for 30 minutes. As a result, only the portion of the metal coat layer which had not been covered with the outer layers 3b of the external electrodes was oxidized, forming the protection layer 4. The remaining portions of the metal coat layer covered with the outer layers 3b of the external electrodes were hardly oxidized and remained as the metal coat layers. Thereafter, the Ni inner plating layers 7a and the solder outer plating layers 7b were formed on the outer layers 3b of the external electrodes.

The varistor of Comparative example 1 has the metal coat layers 8 remaining between the inner layers 3a and the outer layers 3b of the external electrodes as shown in FIG. 13. Because the metal coat layers 8 bond to the inner layers 3a and the outer layers 3b only physically, the bond strength of the external electrodes of the varistor of Comparative example 1 is low compared with that of the external electrodes of the varistors of Examples 1 to 6. As a result, the varistor of Comparative example 1 is poor in surge resistance and pulse resistance.

Comparative Example 2

Figure 15:
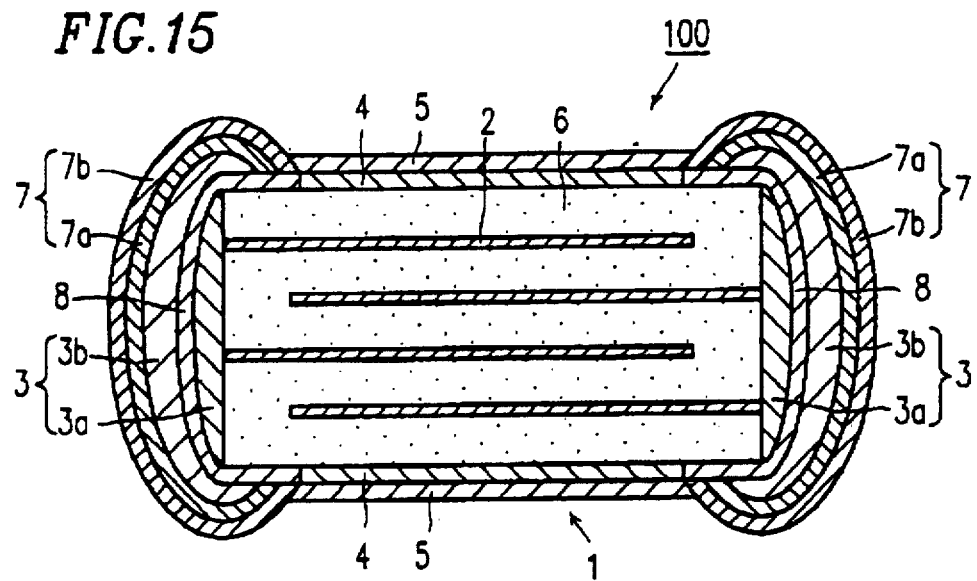
FIG. 15 is a schematic sectional view showing an electronic component of another comparative example.
Figure 16:
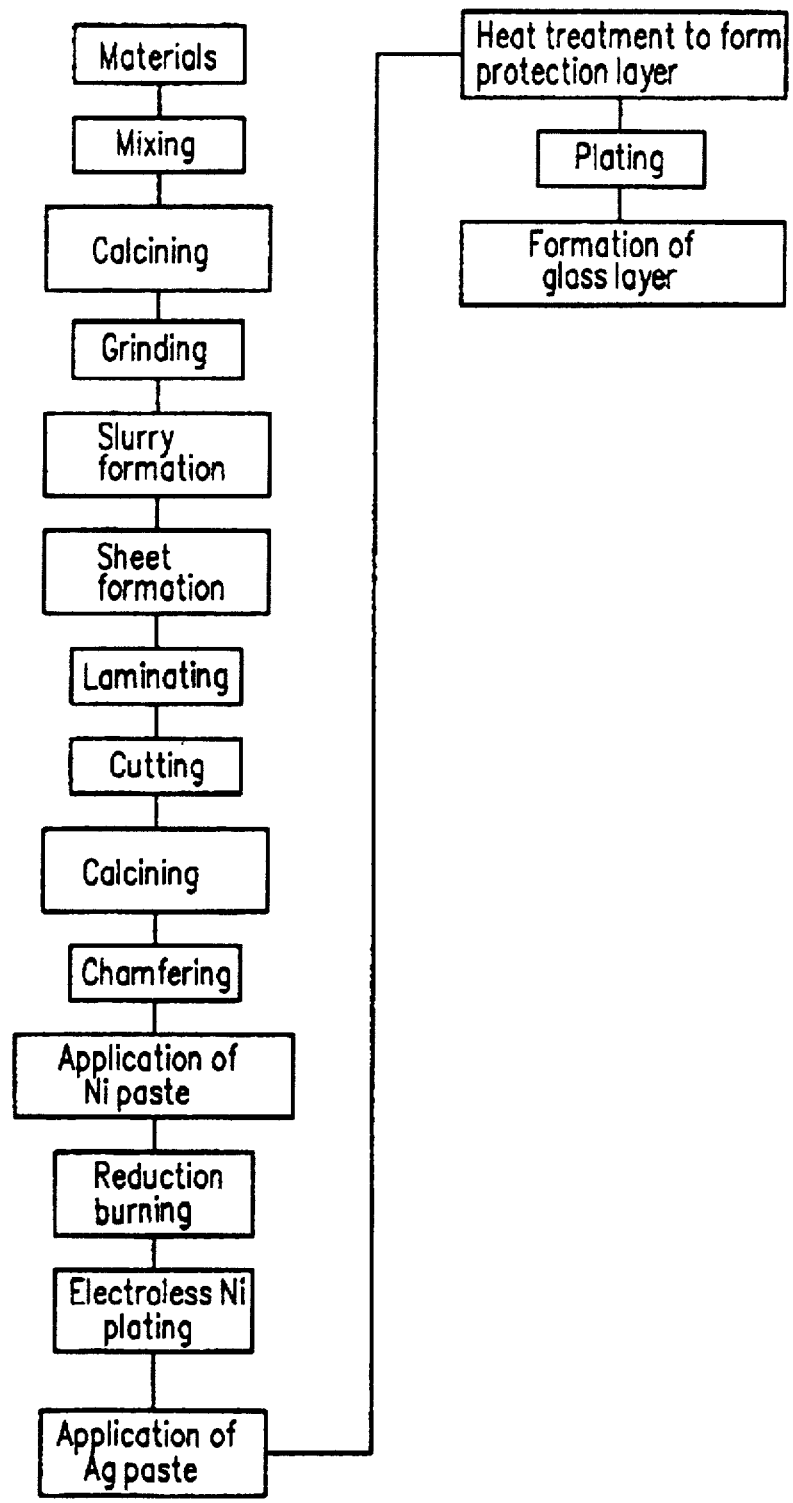
FIG. 16 is a flowchart showing a fabrication method of the electronic component of FIG. 15.

A multilayer varistor as shown in FIG. 15 was fabricated according to the flowchart shown in FIG. 16. Basically, the varistor was fabricated in the same manner as that described in Comparative example 1 except that a glass layer was additionally formed.

Specifically, the element with the protection layer 4 formed thereon was immersed in an alkoxide glass solution (OCD series, manufactured by Tokyo Ohka. Kogyo Co. LTD.) for 5 minutes. The element was then removed from the solution, and heated at 850° C. for 30 minutes by putting the element in contact with powders containing $SiO_2$. Thus, the glass layer 5 was formed.

As in the multilayer varistor of Comparative example 1, the multilayer varistor of Comparative example 2 has the metal coat layers 8 remained between the inner layers 3a and the outer layers 3b of the external electrodes. Accordingly, the bond strength of the external electrodes is low, and as a result, the varistor of Comparative example 2 is poor in surge resistance and pulse resistance.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An electronic component comprising: an element having an internal electrode therein; an external electrode formed on an end portion of the element where an end face of the internal electrode is exposed; and a protection layer formed on the entire surface of the element except for the end portion of the element, wherein the protection layer is made of a metal oxide.

2. The electronic component according to claim 1, further comprising a glass layer formed on the surface of the protection layer.

3. The electronic component according to claim 1, wherein the metal oxide contains a vitreous substance.

4. The electronic component according to claim 1, wherein a material forming the metal oxide is selected from the group consisting of Ni, Cu and a metal compound containing at least one oxide of Si, Ti, Al, Mg, and Zr.

5. The electronic component according to claim 4, wherein the material forming the metal oxide is selected from the group consisting of Ni and Ni compound containing at least one oxide of Si, Ti, Al, Mg, and Zr.

6. The electronic component according to claim 1 further comprising a metal plating layer covering the external electrode.

7. The electronic component according to claim 6, wherein the metal plating layer has a two-layer structure composed of an inner metal plating layer and an outer metal plating layer.

8. The electronic component according to claim 2, wherein the glass layer comprises a filler.

9. The electronic component according to claim 8, wherein the filler is at least one selected from the group consisting of needle-like crystal of $Al_2O_3$, $TiO_2$, ZnO, SIC, $Si_3N_4$, and $SiO_2$, carbon fiber, and glass fiber.

10. The electronic component according to claim 8, wherein the glass layer further comprises a second filler containing at least one selected from the group consisting of $Bi_2O_3$ and $Sb_2O_3$.

11. An electronic component comprising: an element; electrodes formed on a top surface and a bottom surface of the element; and a protection layer formed on the entire surface of the element except for portions where the electrodes have been formed, wherein the protection layer is made of a metal oxide.

12. The electronic component according to claim 11, further comprising a glass layer on the surface of the protection layer.

13. The electronic component according to claim 11, wherein the metal oxide contains a vitreous substance.

14. An electronic component comprising:
an element having an internal electrode therein;
an external electrode formed on an end portion of the element where an end face of the internal electrode is exposed; and
a protection layer formed on the entire surface of the element except for the end portion of the element,
wherein the protection layer is made of a metal oxide and bonds to the surface of the element by a chemical reaction between a portion of the protection layer and the surface of the element.

15. The electronic component according to claim 14, wherein a material forming the metal oxide is selected from the group consisting of Ni, Cu and a metal compound containing at least one oxide of Si, Ti, Al, Mg, and Zr.

16. The electronic component according to claim 15, wherein the material forming the metal oxide is selected from the group consisting of Ni and Ni compound containing at least one oxide of Si, Ti, Al, Mg, and Zr.

17. The electronic component according to claim 14 further comprising a metal plating layer covering the external electrode.

18. The electronic component according to claim 17, wherein the metal plating layer has a two-layer structure composed of an inner metal plating layer and an outer metal plating layer.

19. The electronic component according to claim 14 further comprising a glass layer formed on the surface of the protection layer.

20. The electronic component according to claim 19, wherein the glass layer comprises a filler.

21. The electronic component according to claim 20, wherein the filler is at least one selected from the group consisting of needle-like crystal of $Al_2O_3$, $TiO_2$, ZnO, SiC, $Si_3N_4$, and $SiO_2$, carbon fiber, and glass fiber.

22. The electronic component according to claim 20, wherein the glass layer further comprises a second filler containing at least one selected from the group consisting of $Bi_2O_3$ and $Sb_2O_3$.

* * * * *

UNITED STATES PATENT AND TRADEMARK OFFICE
CERTIFICATE OF CORRECTION

PATENT NO.      : 5,750,264

DATED           : May 12, 1998

INVENTOR(S)     : Iwao Ueno et al.

It is certified that error appears in the above-identified patent and that said Letters Patent is hereby corrected as shown below:

Title page;
[73] Assignee:

Change "Matsushita Electric Industrial Co., Inc." to --Matsushita Electric Industrial Co., Ltd.--.

Claim 9, line 3, change "SIC" to --SiC--.

Signed and Sealed this

Ninth Day of March, 1999

Attest:

Q. TODD DICKINSON

*Attesting Officer*  *Acting Commissioner of Patents and Trademarks*